(12) United States Patent
Gierach et al.

(10) Patent No.: US 10,009,472 B2
(45) Date of Patent: *Jun. 26, 2018

(54) APPARATUS AND METHODS FOR NOTIFICATION OF A PARTY IN A TELEPHONE CONFERENCE

(71) Applicant: Applied Voice & Speech Technologies, Inc., Foothill Ranch, CA (US)

(72) Inventors: Karl Daniel Gierach, Irvine, CA (US); Michael V. Shmalko, Newport Beach, CA (US)

(73) Assignee: Applied Voice & Speech Technologies, Inc., Foothill Ranch, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/204,824

(22) Filed: Jul. 7, 2016

(65) Prior Publication Data

US 2016/0323453 A1 Nov. 3, 2016

Related U.S. Application Data

(63) Continuation of application No. 14/266,681, filed on Apr. 30, 2014, now Pat. No. 9,413,897, which is a continuation of application No. 13/283,533, filed on Oct. 27, 2011, now Pat. No. 8,750,470, which is a continuation of application No. 10/988,809, filed on Nov. 15, 2004, now Pat. No. 8,072,909.

(51) Int. Cl.
*H04N 7/14* (2006.01)
*H04M 3/56* (2006.01)
*H04M 3/428* (2006.01)
*H04M 3/487* (2006.01)

(52) U.S. Cl.
CPC .......... *H04M 3/56* (2013.01); *H04M 3/4288* (2013.01); *H04M 3/568* (2013.01); *H04M 3/4872* (2013.01); *H04M 3/564* (2013.01)

(58) Field of Classification Search
None
See application file for complete search history.

(56) References Cited

U.S. PATENT DOCUMENTS 5,771,065 A * 6/1998 Hijikata ................. H04N 7/147
348/14.01
6,671,262 B1 * 12/2003 Kung ..................... H04L 65/607
370/260

* cited by examiner

*Primary Examiner* — Maria El-Zoobi
(74) *Attorney, Agent, or Firm* — Anatoly S. Weiser, Esq.; IPLCounsel.com

(57) ABSTRACT

Systems, methods, and machine-readable articles of manufacture enable private notification of a participant in a telephone conference. In representative embodiments, a system receives a telephone call intended for a first conference participant, generates an informative announcement containing information regarding the call, mixes the informative announcement with the conference audio, and privately plays the mixed audio to the first participant. In other representative embodiments, the system concurrently generates a non-informative announcement, mixes the non-informative announcement with the conference audio, and plays the second mixed audio to the other conference participant or participants. In this way, the first participant is notified of the incoming call while simultaneously listening to the conference audio, and the information regarding the call is not shared with the other conference participant or participants.

23 Claims, 5 Drawing Sheets

APPARATUS AND METHODS FOR NOTIFICATION OF A PARTY IN A TELEPHONE CONFERENCE

CROSS-REFERENCE TO RELATED APPLICATION

This application is a continuation of and claims priority from U.S. patent application Ser. No. 14/266,681, entitled Apparatus and Method for Notification of a Party in a Telephone Conference, filed on 30 Apr. 2014, now allowed; which is a continuation of and claims priority from U.S. patent application Ser. No. 13/283,533, entitled Apparatus and Method for Notification of a Party in a Telephone Conference, filed on 27 Oct. 2011, now U.S. Pat. No. 8,750,470; which is a continuation of and claims priority from U.S. patent application Ser. No. 10/988,809, entitled Apparatus and Method for Notification of a Party in a Telephone Conference, filed on 15 Nov. 2004, now U.S. Pat. No. 8,072,909. The disclosures of all of the foregoing patent documents are incorporated herein by reference as if fully set forth herein, including Specifications, Figures, Claims, Abstracts, Tables, Appendices, and all other matter in the patent documents.

FIELD OF THE INVENTION

The present invention relates generally to telecommunication systems and methods, and, more particularly, to telephone call management systems and methods for announcing telephone calls.

BACKGROUND

Even with the relatively recent proliferation of email, instant messaging, and similar communication technologies, telephone services remain important to an average person or business. Indeed, it appears that the number of individual telephone lines in use is constantly increasing. The number and sophistication of feature functions available from both telephone systems and telephone service providers also continue to increase. Call answering, voice messaging, and automated attendant ("auto attendant") are some of the more popular feature functions commonly offered by telephone systems and service providers.

An auto attendant system typically answers the incoming calls, greets the callers, and transfers the calls to selected extensions. Some auto attendant systems interact with the callers using, for example, dual tone multi-frequency (DTMF or touch-tone) key input. Other auto attendant systems accept voice input, which they process using automatic speech recognition capabilities. Still other systems can receive and process both DTMF and voice input. Representative auto attendant systems of all three types can support call screening. For example, an auto attendant system can identify the telephone number from which the call originated using caller ID information carried by the call, and display the number and a name associated with the number to the called person. The system can also request a caller to identify himself (or herself, as the case may be), record the caller's response, and play the response to the called person. In either case, the called person can accept the call, reject the call, or add the call to a telephone conference session.

Announcement of the new call can be made through the handset, headset, or loudspeaker of the telephone device used by the called person. This technique is convenient if the called person is engaged in an existing telephone conference session when the new call comes in. Privacy concerns, however, limit usefulness of such announcements if conferees other than the called person can hear the announcements. To prevent all conferees from hearing the announcements intended for one of the conferees, the connection of the called person-conferee to the telephone conference can be temporarily interrupted during the announcement. Unfortunately, this method of announcing new calls can disrupt the conference. The importance of the disruption varies, depending, for example, on the length of the announcement, and on whether the called person was speaking at the time of the disruption. Furthermore, the other conferees may be left with the impression that the called person has left the conference, and the called party can miss important conversation that takes place during the announcement. If the conference is being recorded, the disruptions may also interfere with the recording process.

It would be desirable to avoid such disruptions when making private informative audio announcements to a participant in a telephone conference. It would also be desirable not to create an impression that the participant receiving the announcement has left the conference during such announcements. It would further be desirable not to cause the participant receiving the announcement to miss the conference conversation that takes place during the announcement. Still further, it would be desirable to facilitate the process of recording the conference while enabling private notification of various conferees.

SUMMARY

A need thus exists for apparatus, methods, and articles of manufacture capable of providing a private, customizable audio announcement to a person who is already connected to a two-party or multi-party telephone conference with one or more other conferees, while reducing disruption of the telephone conference. A need also exists for apparatus and methods capable of providing such announcement to the person while making the announcement transparent to other conferees, or while providing a second announcement to the other conferees. A further need exists for apparatus and methods capable of providing such announcement to the person while simultaneously providing to the person the audio signal from the conference. Still another need exists for apparatus and methods capable of providing such announcement to the person while seamlessly recording the conference.

Embodiments of the present invention are directed to methods, apparatus, and articles of manufacture that satisfy one or more of these needs. In some embodiments, the invention herein disclosed involves integration of existing telephony hardware and software application program interfaces (APIs) with an existing voice recognition engine and its associated API. An integration software layer provides the implementation and process of the invention in these embodiments.

In one exemplary embodiment, the invention herein disclosed is a method of providing information to a first conferee participating in a telephone conference with at least one second conferee. In accordance with this method, a first connection that provides audio data generated by the at least one second conferee to the first conferee is severed. At the same time, the audio data generated by the at least one second conferee is received, for example, through a first alternative connection such as an audio buffer. The received audio data is mixed (i.e., combined) with a first announcement to obtain first mixed audio data. The first mixed audio data is provided to the first conferee in real time after severing the first connection, and the audio data generated by the first conferee is provided to the at least one second conferee in real time after severing the first connection.

The method may further include severing a second connection that provides audio data generated by the first conferee to the at least one second conferee, and mixing a second announcement with the audio data generated by the first conferee (received, e.g., through a second alternative connection which may include an audio buffer) to obtain second mixed audio data. The second mixed audio data is then provided to the at least one second conferee in real time after severing the second connection.

The first announcement may include information relating to a telephone call directed to the first telephone device. For example, the announcement may include the name, number, and a short message from the caller. This information is provided to the first conferee privately; the second conferee(s) do(es) not hear the first announcement. The first announcement may also include notification regarding (1) emergencies, e.g., natural disasters, (2) arrival of messages meeting predetermined criteria, e.g., facsimiles or email of predefined importance, (3) stock trades, (4) financial events, e.g., price fluctuations, and (4) similar events.

These and other features and aspects of the present invention will be better understood with reference to the following description, drawings, and appended claims.

DETAILED DESCRIPTION

Figure 1:
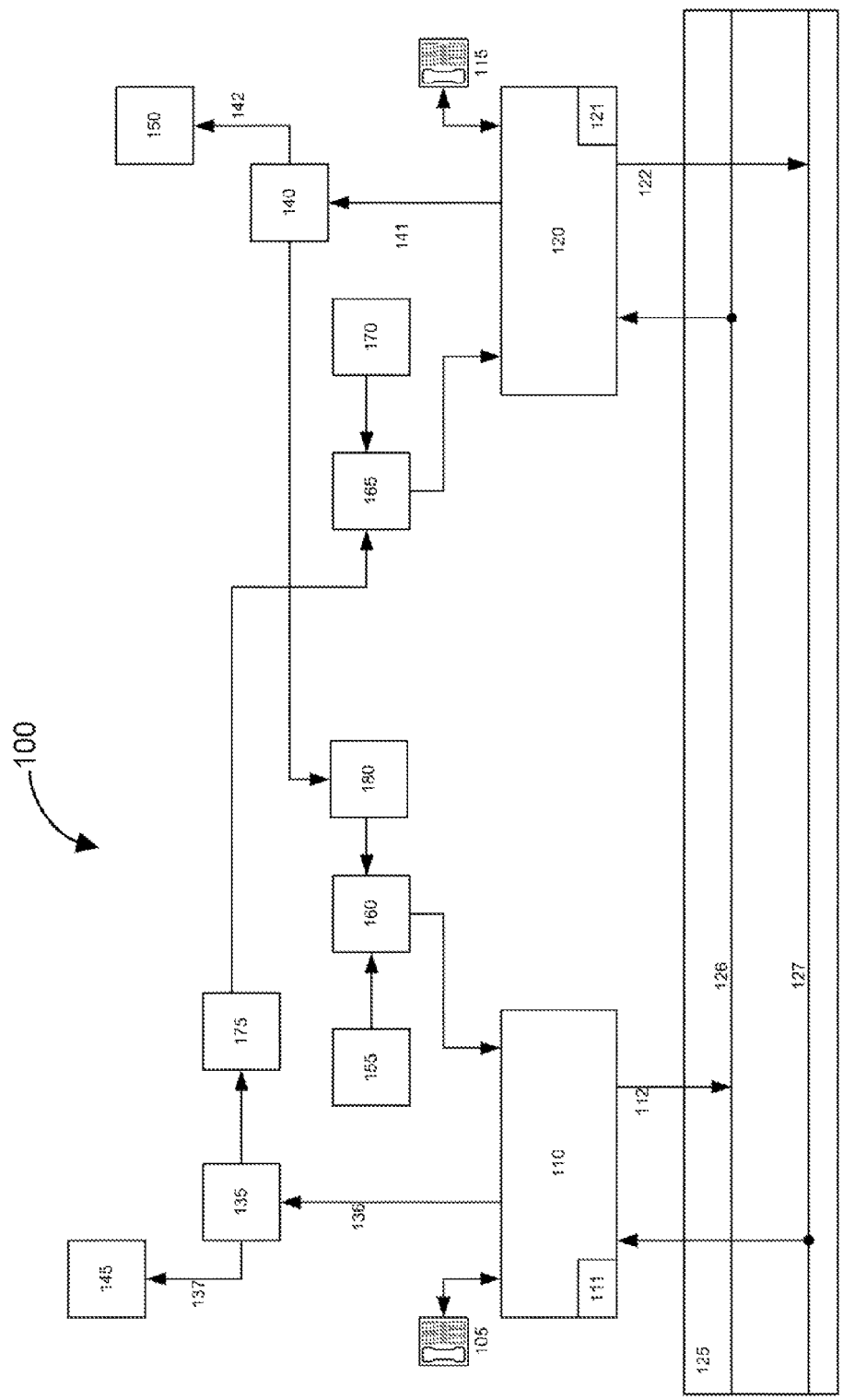
FIG. 1 is a high-level block diagram of a call management system capable of providing private announcement to a conferee participating in a telephone conference, in accordance with an embodiment of the present invention.

In this document, the words "embodiment" and "variant" refer to particular apparatus or process, and not necessarily to the same apparatus or process. Thus, "one embodiment" (or a similar expression) used in one place or context can refer to a particular apparatus or process; the same or a similar expression in a different place can refer to a different apparatus or process. The expression "alternative embodiment" and similar phrases are used to indicate one of a number of different possible embodiments. The number of potential embodiments is not necessarily limited to two or any other quantity. The word "subscriber" signifies a person who can receive a call processed by a call management system. Generally, a subscriber has a preexisting association with the system. For example, a subscriber may be an employee of an organization using the call management system. A "caller" is a person who places a telephone call received by the call management system. The call can be placed from a location external to the call management system, or from a location served by the system, such as a telephone extension connected to the system. Note that a "caller" may also be a "subscriber." The words "couple," "connect," and similar expressions with their inflectional morphemes do not necessarily import an immediate or direct connection, but include connections through mediate elements within their meaning. The word "conference" refers to a telephone conference between two or more participating conferees. A "two-party conference" means a conference between two participating conferees. A "multi-party conference" means a conference with at least three participating conferees. A "conferee" is a person participating in a conference, which can be a two- or a multi-party conference. A conferee may (but need not) be a caller or a subscriber. The scope and spirit of the invention should not be construed as strictly limited to any of these definitions, or to the specific examples mentioned herein.

The invention herein disclosed can be implemented in a call management system, such as the call management systems described in a related patent application entitled APPARATUS AND METHOD FOR PERSONALIZED CALL ACKNOWLEDGEMENT, filed on Sep. 2, 2004, Ser. No. 10/932,745, also assigned to the assignee of the present invention. This related application is incorporated herein by reference in its entirety.

Reference will now be made in detail to several embodiments of the invention that are illustrated in the accompanying drawings. Same or similar reference numerals may be used in the drawings and the description to refer to the same or like apparatus elements and method steps. The drawings are in simplified form, not to scale, and omit apparatus elements and method steps that can be added to the described systems and methods, while including certain optional elements and steps.

FIG. 1 illustrates, in a high-level block diagram manner, a call management system 100 capable of providing private notification to a first conferee at a telephone device 105. The telephone device 105 is connected to a computer telephony device 110, for example, a Dialogic® computer telephony board available from Intel corporation. Similarly, a second conferee at a telephone device 115 is connected to a computer telephony device 120. The computer telephony device 120 can be provided, for example, by the same computer telephony board as the board that hosts the device 110, or by another computer telephony board. Operation of the computer telephony devices 110 and 120 is controlled by application code stored in channel 1 and channel 2 application code memories 111 and 121, respectively. The code may be loaded from a machine-readable medium, such as a CD, DVD, flash memory, floppy or hard drive, or a similar memory or storage device.

As described above, the computer telephony devices 110 and 120 may be conventional devices designed for use with switched circuit telephone systems. Additionally, the devices 110 and 120 may be virtual devices and may include interfaces capable of using, for example, Internet Protocol (IP), such as Voice over IP (VoIP), or other packet switching network technology to transfer audio data between conference participants. In some non-limiting embodiments, properties of the computer telephony devices 110 and 120 are as follows:

The devices simultaneously provide access to receive and transmit audio streams of individual channels.

The devices are capable of being coupled (patched) to each other and to other telephony devices. Each device can then hear (receive) audio data from telephones coupled to other computer telephony devices to which the device is coupled. In this mode, the device allows access to the audio stream spoken by a user on the telephone coupled with the device.

The telephone devices 105 and 115 (e.g., conventional, cordless, or wireless telephones) can be connected to their respective computer telephony devices 110 and 120 without any intermediate devices; this may the case if the telephone devices 105 and 115 are part of the system 100 and are located on the same or neighboring premises as the system 100. In a variant of this embodiment, one or both of the telephone devices 105 and 115 are part of the system 100, but are remote to each other. In another variant, one or both telephone devices 105 and 115 are connected to their respective computer telephony devices via a telephone network and appropriate network interfaces, such as a switched telephone network and loop start interfaces, or an Internet Protocol-based (IP-based) packet network with voice over IP (VoIP) trunk interfaces. Other networks, for example, intranets, extranets, virtual private networks (VPNs), local area network (LANs), wide area network (WANs), enterprise networks, private switched networks, and connection-oriented networks can also be used to connect the telephone devices 105 and 115 to the computer telephony devices 110 and 120.

An audio bus board 125 provides a communication medium for interconnecting the computer telephony devices 110 and 120. In the illustrated embodiment, the audio bus board 125 is an SCBus-compatible board supporting a framework for patching/connecting together audio channels. (The telephone call patching/connecting capability of the board 125 and the devices 110 and 120 will be referred to as the "patching framework.") The SCBus is a real-time, high speed, time division multiplexed (TDM) communications bus that provides 1024 time slots (channels) capable of carrying digital information between SCBus-compatible devices. In various embodiments, other communication media capable of supporting the patching framework of digital channels are used for interconnecting the computer telephony devices 110 and 120, including H.100-compatible buses, packet switching interconnections, and other interconnection means. In one embodiment, the audio bus board includes multiplexing software that receives audio from one computer telephony device and redirects the audio to another computer telephony device, using IP/Packet Switching framework. An example of such framework is a Dialogic® Host Media Processing system, which is also available from Intel Inc. It should be noted that the invention need not be construed as limited to implementations based on a specific bus or software.

As illustrated in FIG. 1, the audio bus board 125 includes half duplex dedicated channels 126 and 127. The channel 126 carries audio data from the computer telephony device 110 to the computer telephony device 120; the channel 127 carries audio data in the opposite direction between these two devices. Thus, with respect to the device 110, the channel 126 is a transmit channel, while the channel 127 is a receive or "listen" channel; with respect to the device 120, the channel 127 is a transmit channel, while the channel 126 is a receive channel.

Reference numerals 135 and 140 designate fast audio buffers associated with the computer telephony devices 110 and 120, respectively. In the illustrated embodiment, each fast audio buffer 135 and 140 is a memory buffer that uses hardware level synchronization via an operating system level API. It contains its own thread of execution dedicated to distributing and, possibly, mixing audio data. The audio data is dumped to the fast audio buffers via connections 136 and 141, from one of the device driver level threads of the computer telephony device associated with the buffers, i.e., device 110 driver level thread in case of the buffer 135, and device 120 driver level thread in case of the buffer 140. The audio data can be provided to the buffer 135 in parallel (simultaneously) with the same audio data feeding into the channel 126 via a connection 112. From the buffer 135, the audio data is made available, over a connection 137, to an automatic speech recognition (ASR) module 145. Similarly, the audio data can be provided to the buffer 140 in parallel with the same audio data feeding into the channel 127 via a connection 122. From the buffer 140, the audio data is made available over a connection 142 to an automatic speech recognition module 150.

The buffers 135/140 and the ASR modules 145/150 may be incorporated into the computer telephony devices with which they are associated, i.e., the buffer 135 and the ASR module 145 may reside on the device 110, and the buffer 140 and the ASR module 150 may reside on the device 120. Alternatively, the buffers and/or the ASR modules may be located elsewhere within the system 100.

Prior to generation of an announcement to the first conferee at the telephone device 105, the system 100 operates as follows. Audio data from each conferee leaves the conferee's respective computer telephony device (110 or 120) simultaneously via two separate routes. First, the audio is streamed from an audio streaming API of the conferee's computer telephony device 110 to the buffer 135, eventually making its way to the ASR module 145 of the same channel. Similarly, audio data from the second conferee is streamed to the buffer 140 using an audio streaming API of the device 120, eventually making its way to the ASR module 150 of the same channel. The audio data from both conferees is recorded via the respective computer telephony boards' software APIs. The second route for each audio data stream is provided by binding the two computer telephony devices 110 and 120 to each other in a full duplex connection via the patching framework of the audio bus board 125, which enables communication via the channels 126 and 127. The channels 126 and 127 carry the audio data of each conferee to the computer telephony device of the other conferee, thus allowing the conferees to hear each other.

Speech recognition can be employed to enable one or both conferees to break the conference patch at any time during the conference call. The conference can be broken, for example, if the ASR detects a keyword or key phrase (e.g., "leave conference") uttered by either party involved in the conference.

An informative announcement generator block 155 is capable of generating an announcement to the first conferee. For example, the announcement generated for the first conferee may contain a notification of an incoming telephone call intended for the first conferee, and an informative message relating to the incoming telephone call, such as the telephone number and name of the caller.

A non-informative announcement generator block 170 is capable of generating an announcement for the second conferee. In one embodiment, the notification of the second conferee does not include any information about the call, such as the information given to the first conferee (to whom the call is directed). For example, the announcement generated for the second conferee may be a simple jingle, or a notification that the first conferee has been temporarily "interrupted," without giving a reason for the temporary interruption.

The announcement generator blocks 155 and 170 are connected, respectively, to audio mixers 160 and 165. The audio mixer 160 is also coupled to the fast buffer 140 through a first partner channel audio buffer 180, while the audio mixer 165 is also coupled to the fast buffer 135 through a second partner channel audio buffer 175. Thus, each of the audio mixers 160 and 165 can receive both (1) an announcement generated by one of the announcement generator blocks (block 155 in case of the mixer 160, and block 170 in case of the mixer 165), and (2) the audio from a partner channel fast buffer (fast buffer 140 in case of the mixer 160, and fast buffer 135 in case of the mixer 165). Each mixer is capable of combining the two received audio streams and providing the combined audio to the computer telephony device associated with the mixer, as is illustrated in FIG. 1. Each mixed audio stream is then sent to the telephone device connected to the computer telephony device associated with the mixer. This may be done, for example, via the computer telephony device's software API.

After an incoming call intended for the first conferee is identified, the state of the system 100 is modified for the purpose of presenting the call. Information relating to the call or the caller is determined using, for example, automatic number identification (ANI), dialed number identification system (DNIS), direct inward dial (DID), caller self-identification provided in response to an auto attendant query, or other proprietary or non-proprietary means. This information is then translated into an informative announcement. For example, (1) the telephone number of the caller can be translated into the informative message using an audio generator capable of playing back recorded audio of digits, (2) the caller's name can be played using a text-to-speech converter, or (3) the caller's self-identification can be appended to a jingle and an introductory phrase, such as " . . . is calling." The informative announcement is generated by the informative announcement generator block 155. At the same time, a non-informative announcement is generated by the non-informative announcement generator block 170.

It should be noted that the announcement generated by the block 170 is "non-informative" in the sense that it is not identical to and does not carry all the information that is included in the informative announcement generated by the block 155. The non-informative announcement generated by the block 170 may nevertheless contain information useful to the second conferee.

When the messages are ready to be played to the conferees, the patch (connections) between the two computer telephony devices 110 and 120 created by the channels 126 and 127 is severed, and conference audio, together with the informative and non-informative announcements, is rerouted and played in real time to the first and second conferees. In this embodiment, the audio data from the first conferee is now streamed to the second conferee through the buffers 135 and 175, and the mixer 165; the audio data from the second conferee is streamed to the first conferee through the buffers 140 and 180, and the mixer 160. Rerouting of the audio streams can be achieved, for example, using full duplex audio processing capabilities present on the computer telephony devices 110 and 120, namely the ability to perform simultaneous play (sending audio) and record (receiving audio) on the ports connected to the telephone devices 105 and 115.

Note that "severing" the patch does not necessarily imply that the channels 126 and 127 are released, or that the audio data from the conferees no longer travels through these channels. The patch is severed in the sense that the audio data played to the conferees is no longer received from the channels 126 and 127. Of course, the patch may also be severed simply by not sending the audio data through the channels.

In one variant of the embodiment illustrated in FIG. 1, the audio generated by the first conferee is interrupted during the announcements. This feature may be made dependent on the status of the telephone device 105. For example, if the first conferee is using a full duplex speakerphone, the audio generated by the first conferee may be interrupted during the informative announcement, but not otherwise. Similarly, the audio from the first conferee may be interrupted during the informative announcement if the audio is below a predefined threshold, e.g., when the first conferee is not speaking.

Severing the patch between the computer telephony devices 110 and 120 may be done substantially simultaneously with beginning of playing the mixed audio streams from the mixers 160 and 165. The volume of each mixed audio stream is adjusted so that the audio signal corresponding to the conference closely approximates the volume of the conference audio provided to the associated telephone device 105/115 before the patch is severed. Perceptible audio glitching (a hiccup or spurious audio signal) during the transition can therefore be reduced or eliminated altogether. The jingle and/or the introductory phrase in the announcement(s) can also help mask the glitching. Furthermore, glitching can be reduced by caching a small section of the recorded audio data in order to minimize the loss of any audio data when the conference patch is broken and audio is first transferred between the conferees via the mixers 160/165.

Thus, during the announcements the audio from each telephone device in the conference is transmitted to its partner port via the invention's software implementation. Separate, customized audio announcements can be played to each conferee. This allows a private announcement, for example, of the caller's identity, to be played only to one party in the conference, while simultaneously allowing the conference audio from the other party or parties to be heard by each conferee.

In some embodiments, the firmware buffers on the computer telephony devices 110 and 120 are reduced during the announcements. In one specific embodiment that uses an audio stream rate of 8,000 bytes per second, the buffers are reduced to 1024 bytes.

After the announcements, the playing of audio through the buffers and mixers (i.e., through elements 160, 165, 175, and 180) is stopped, and the connections via the patching framework of the board 125 and the computer telephony devices 110 and 120 are restored. Note that the restored connections may use the same audio bus board channels as were used before the connections were severed. Alternatively, one or more of the restored connections may use different channels. The system 100 then resumes its operation in substantially the same way as it was operating before the incoming call was received. In this way, the first conferee has been notified regarding the oncoming telephone call in a hands-free and vision-free mode, while maintaining a two-party conference and preserving privacy of the information in the notification.

The first conferee may issue a command to the system 100 in order to exit the conference and accept the incoming call, or add the call to the conference. This may be done either during or after the announcement of the call. In some embodiments, for example, the first conferee can issue a voice command to the system 100. The command is interpreted by the ASR module 145, and the system 100 then performs additional patching in accordance with the command.

Figure 2:
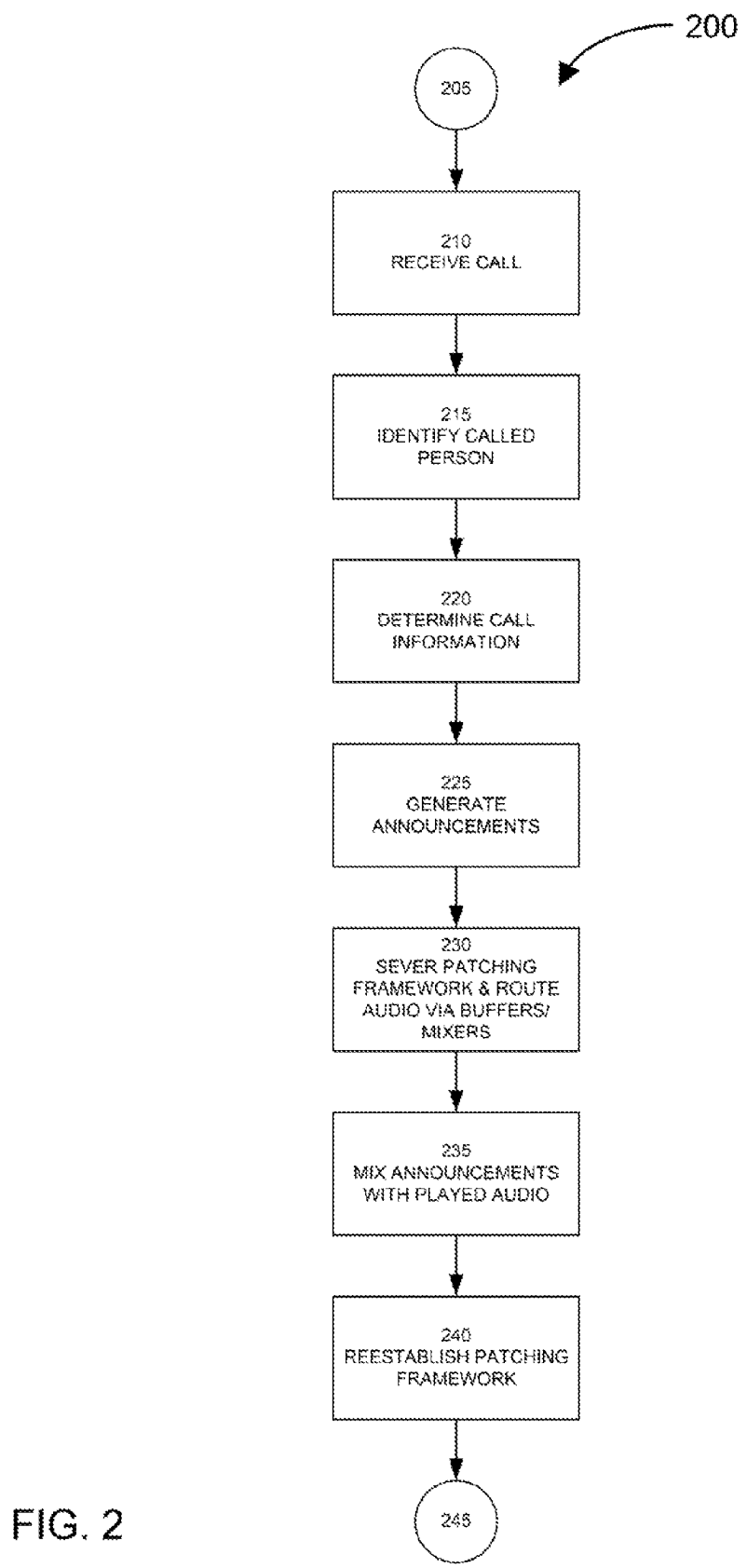
FIG. 2 is a process flow diagram illustrating selected steps of a process for providing private announcement regarding an incoming telephone call to a conferee during a telephone conference, in accordance with an embodiment of the present invention.

FIG. 2 is a process flow diagram illustrating selected steps of a process 200 for providing announcement to a conferee during a conference. Although the process steps are described serially, certain steps can be performed by separate elements in conjunction or in parallel, asynchronously or synchronously, in a pipelined manner, or otherwise. There is no particular requirement that the steps be performed in the same order in which this description lists them, except where explicitly so indicated or otherwise made clear from the context. Furthermore, not every illustrated step is required in every embodiment in accordance with the invention, while some steps that have not been specifically illustrated may be desirable or necessary in some embodiments in accordance with the invention.

At a flow point 205, a call management system (such as the system 100) is maintaining a connection between a first conferee and a second conferee using a patching framework. The system 100 is also buffering the audio output of the conferees (via the buffers 135 and 140), and recording the audio output of the conferees. At step 210, the call management system receives an incoming call intended for the first conferee. At step 215, the system identifies the first conferee as the person to whom the call is directed. For example, if the first conferee has a specific telephone number that the caller has dialed, the system can identify the first conferee from the telephone number. The system can also ask the caller (e.g., using interactive voice response capability) to key in the extension that the caller wishes to reach, and then identify the first conferee from the keyed digits. In another variant, the system asks the caller to speak the name of the person whom the caller wishes to reach, and uses automatic speech recognition to match the spoken name to stored grammar of the first conferee's name.

At step 220, the system determines call information relating to the call. In some embodiments, the information helps the first conferee (or another called person) to make an informed decision whether to take the call, acknowledge the call, or reject the call. For example, the information may include the originating telephone number obtained from an ANI module. The information may also include the caller's name provided by the caller in response to a request generated by the call management system. Further, the system may attempt to identify the caller by matching the caller's voice print to voice prints of callers known to call the first conferee, or from another caller list available to the system. The caller's voice print may be obtained, for example, when the caller identifies the first conferee or issues voice commands to the system.

At step 225, the system generates an informative announcement for the first conferee and a non-informative announcement for the second conferee.

At step 230, the system severs the patch between the conferees, and simultaneously begins to play the audio output by each conferee to the other conferee through an alternative path that includes an audio mixer (160, 165) and buffer with an ability do distribute data to different destinations at the same time (135, 140).

At step 235, the audio played to the first conferee is mixed with the audio of the informative announcement, and the audio played to the second conferee is mixed with the audio of the non-informative announcement.

At step 240, both announcements conclude and the patching framework is reestablished. At the same time, the playing of audio through the mixers and buffers is terminated.

At a flow point 245, the conference is restored to its pre-announcement state, and the system stands ready to receive verbal (or other) commands from the conferees and act upon the commands. For example, the first conferee may utter a verbal command to accept the incoming call and leave the conference, or to patch the incoming call to the conference.

Note that the verbal command may be uttered and received by the system earlier, for example, during performance of step 235, as audio is still being transmitted to the ASR module associated with a particular channel.

Figure 3:
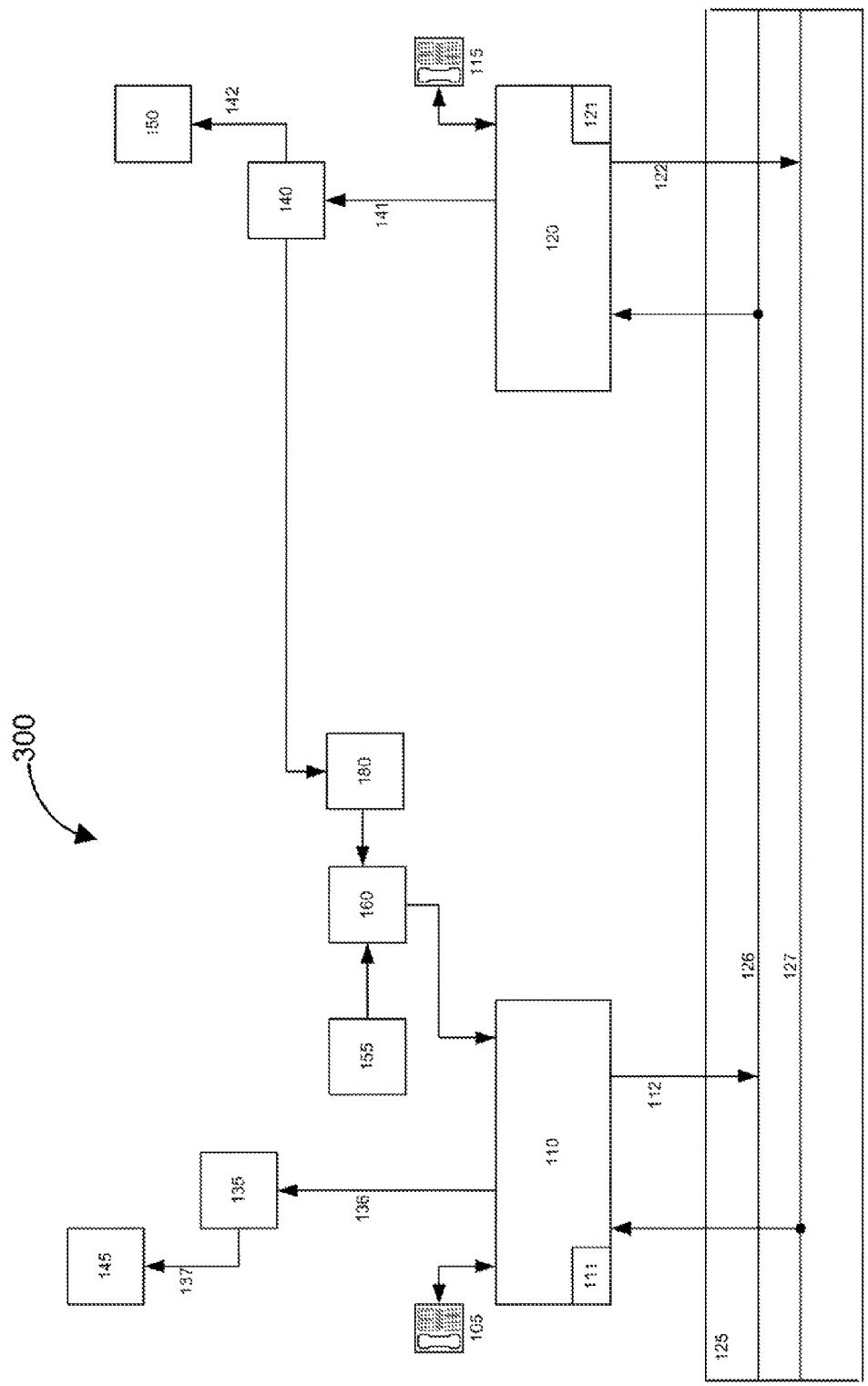
FIG. 3 is a high-level block diagram of another call management system capable of providing private announcement to a conferee participating in a telephone conference, in accordance with an embodiment of the present invention.

In embodiments where the non-informative announcement is not made to the second conferee, the non-informative announcement need not be generated and there is no need to include the block 170 and the mixer 165 in the call management system 100. This is illustrated in FIG. 3. During notification of the first conferee, the second conferee may remain patched to the first conferee through the patching framework of the channel 126 of the audio bus board 125 and the computer telephony devices 110 and 120. Here, the patching framework connections are severed with respect to the audio data carried from the device 120 to the device 110 by the channel 127; the connections remain intact with respect to the audio data carried by the channel 126 in the opposite direction. The audio data from the device 120 is mixed together with the announcement generated by the informative announcement generator block 155 and provided to the first conferee at the telephone device 105, substantially in the same way as this is done in the system 100 of FIG. 1.

Figure 4A:
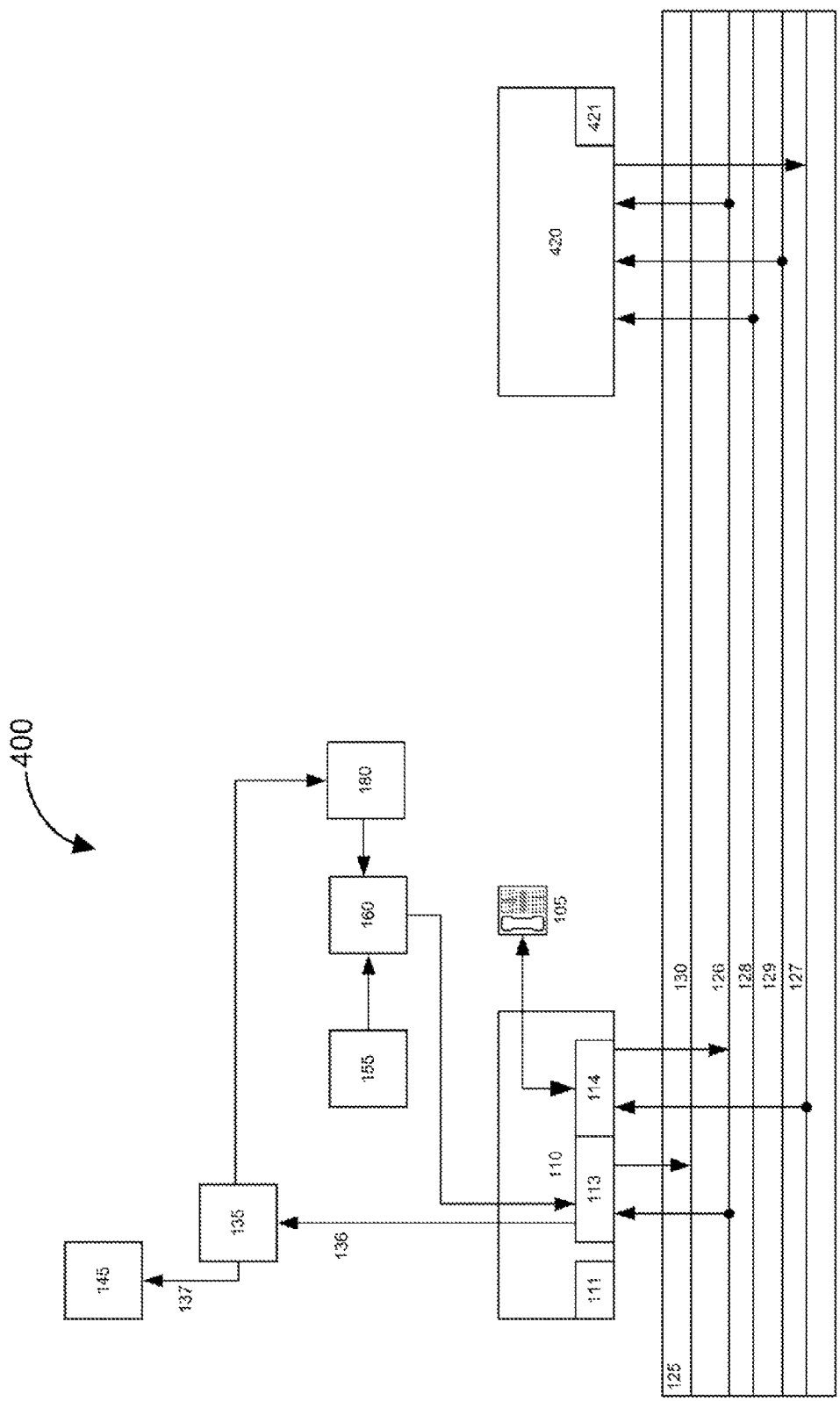
FIG. 4A is a high-level block diagram of a call management system capable of providing private announcement to a conferee participating in a multi-party telephone conference, with the system being configured in a pre-announcement state.
Figure 4B:
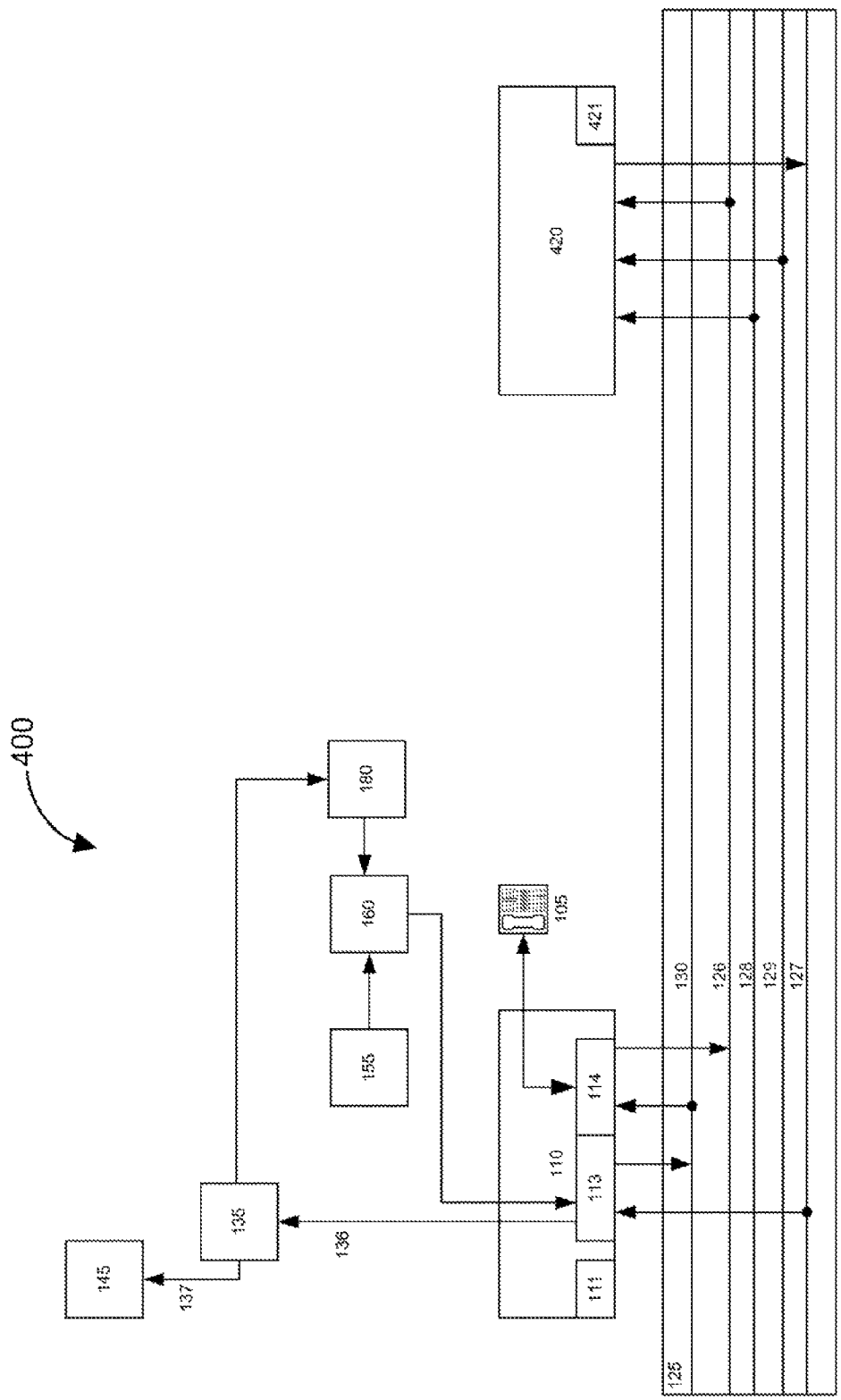
FIG. 4B is a high-level block diagram of the call management system of FIG. 4A configured in an announcement delivery state.

The methods and systems described in this document need not be limited to operation in a two-party conference. FIGS. 4A and 4B illustrate, in a high-level block diagram manner, operation of a call management system 400 capable of providing private notification to a first conferee at a telephone device 105 participating in a multi-party conference. On the side of the telephone device 105 and computer telephony device 110, the operation of the system 400 is similar to that of the system 100 of FIG. 1. Note, however, that FIGS. 4A and 4B illustrate some additional details of the computer telephony device 110 that were not shown in FIG. 1. The additional details include a media resource 113 and a loop start interface 114. The loop start interface 114, which may be a digital interface, enables the computer telephony device 110 to maintain a full duplex connection to the first conferee at the telephone device 105. The media resource 113 enables the device 110 to record and play received audio.

In the system 400, a computer telephony device 420 implements a conference resource to enable conferencing of the first conferee at the telephone device 105 with two or more additional conferees. (The additional conferees are not shown for simplicity.) Operation of the device 420 is controlled by application code stored in an application code memory 421. In the embodiment illustrated in FIGS. 4A and 4B, the audio bus board 125 also connects the computer telephony device 420 to the additional conferees using channel 127 (which acts as a common conference output channel in this embodiment) and dedicated input channels 128 and 129, one dedicated input channel per conferee. The dedicated input channels carry audio data generated by the additional conferees to the conference resource of the computer telephony device 420. The channel 126 carries audio data from the first conferee at the telephone device 105 to the conference resource on the computer telephony device 420.

As illustrated in FIG. 4A, prior to generation of an announcement to the first conferee the conference resource combines the audio data received from the additional conferees with the audio data received from the first conferee. The conference resource then distributes the resulting combined audio stream to all the conferees, including the first conferee, using the common conference output channel 127. The loop start interface 114 receives the combined audio stream of the conference from the channel 127, and plays the audio embedded in the stream to the first conferee at the telephone device 105. The loop start interface 114 further receives the audio generated by the first conferee, digitizes, encodes, and otherwise formats the audio for transmission, and transmits the resulting audio stream to the conference resource at the device 120 over the channel 126. The media resource 113 also listens to the clean audio of the first conferee transmitted on the channel 126, and sends the audio to the audio buffer 135.

Note that in some variants of the embodiment of FIGS. 4A and 4B, the conference resource combines together the audio of only selected conferees to generate the combined audio stream. For example, audio of two conferees with highest volumes can be mixed to generate the combined audio stream.

After an incoming call intended for the first conferee is identified, the state of the system 400 is modified for the purpose of presenting the call. The modified state of the system 400 is illustrated in FIG. 4B. Information relating to the call or the caller is determined using, for example, techniques described above in relation to the system 100 of FIG. 1. An informative announcement generator block 155 translates this information into an informative announcement. In some variants of this embodiment, a non-informative announcement for the other conferees is generated concurrently with generation of the informative announcement.

When the informative announcement is ready to be played to the first conferee, the connection via the patching framework is modified so that the audio stream of the conference transmitted on the channel 127 is now received by the media resource 113. From the media resource 113 the audio stream of the conference is sent to the audio mixer 160 via the buffers 135 and 180. The audio mixer 160 also receives the informative announcement from the block 155, and combines the informative announcement with the conference audio received from the media resource 113. The resulting audio stream, which is intended for the first conferee, is forwarded to the media resource 113. From there, the resulting audio stream is forwarded to the telephone device 105 via a channel 130 of the audio bus board 125 and the loop start interface 114.

As is illustrated in FIG. 4B, the patching framework connections remain unchanged with respect to the audio data carried by the channel 126 from the device 110 to the conference resource at the device 420. The patching framework also remains unchanged with respect to the audio data of additional conferees carried to the device 420 by the dedicated channels 128 and 129, and the conference audio data carried by the channel 127 to the additional conferees.

Although the embodiments described above involved announcements of incoming calls to a conferee, other announcements also fall within the scope of the invention. For example, an external process may be programmed to deliver important real-time messages to a system user. In this scenario, the identity of the first conferee may be known to the system because of the conferee's use of a specific telephone or computer telephony device, or because the conferee has logged into the system. Real-time information may then be implicitly addressed to that particular conferee. Examples of real-time information include notification of natural disasters and other emergencies, arrival of important email and other messages, important stock trades, price fluctuations, and similar events. Broadcasting and multicasting announcements also fall within the scope of the invention. In the present context, a broadcasting announcement is a system-wide announcement directed to all system users. A multicast announcement is an announcement directed to a predetermined group of system users, such as members of a workgroup or a department.

This document describes the inventive apparatus, methods, and articles of manufacture for private notification of a party in a telephone conference in considerable detail. This was done for illustration purposes only. Neither the specific embodiments of the invention as a whole, nor those of its features limit the general principles underlying the invention. The specific features described herein may be used in some embodiments, but not in others, without departure from the spirit and scope of the invention as set forth. Various physical arrangements of components and various step sequences also fall within the intended scope of the invention. Furthermore, the invention need not be implemented in a multi-functional call management and/or auto attendant system. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is carried out by the claims and their equivalents.

We claim:

1. A telephone system, comprising:
    a first computer telephony device coupled to a first telephone;
    a second computer telephony device coupled to a second telephone;
    an audio bus coupled to the first and second computer telephony devices to provide a patching framework;
    a first announcement generator configured to generate a first announcement in response to one or more predetermined conditions; and
    a first mixer coupled to the first announcement generator and the first computer telephony device to mix the first announcement and audio data generated at the second telephone, thereby obtaining a first mixed audio stream, and providing the first mixed audio stream to the first telephone in real time via the first computer telephony device;
    wherein the telephone system is configured so that the first announcement is not provided to the second telephone.

2. The telephone system according to claim 1, wherein the one or more predetermined conditions comprise receiving a call directed to the first telephone, wherein the first announcement comprises call information obtained from the call.

3. The telephone system according to claim 2, wherein the first announcement comprises at least one item selected from the group consisting of a name of a person associated with a telephone number from which the call originated, and the telephone number from which the call originated.

4. The telephone system according to claim 2, wherein:
the second computer telephony device comprises a conference resource configured to provide conferencing services between the first telephone device, the second telephone device, and at least one third telephone device.

5. The telephone system according to, claim 2, further comprising:
a second, announcement generator configured to provide a second announcement; and
a second mixer coupled to the second announcement generator and the second computer telephony device, to mix the second announcement and audio data generated at the first telephone, thereby obtaining a second mixed audio stream, and providing the second mixed audio stream to the second telephone device in real time via the first computer telephony device, wherein the telephone system is configured so that the second announcement is not provided to the first telephone.

6. The telephone system according to claim 5, wherein:
the second computer telephony device comprises a conference resource configured to provide conferencing services between the first telephone device, the second telephone device, and at least one third telephone device, and the second mixer is further configured to provide the second mixed audio stream to the at least one third telephone device.

7. The telephone system according to claim 1, wherein the one or more predetermined conditions comprise receipt of an electronic message.

8. An article of manufacture comprising one or more machine-readable memory devices storing program code, the program code comprising instructions that, when executed by one or more processors of a telephone system, configure the telephone system to:
sever a first connection that provides audio data generated by at least one second conferee to a first conferee;
receive the audio data generated by the at least one second conferee;
mix the audio data generated by the at least one second conferee with a first announcement to obtain first mixed audio data;
provide the first mixed audio data to the first conferee in real time after severing the first connection; and
provide audio data generated by the first conferee to the at least one second conferee in real time after severing the first connection, wherein the first announcement is not provided to the at least one second conferee.

9. The article of manufacture according to claim 8, wherein when the instructions are executed by the one or more processors of the telephone system, the instructions further configure the telephone system to:
sever a second connection that provides audio data generated by the first conferee, to the at least one second conferee;
mix a second announcement with the audio data generated by the first conferee to obtain second mixed audio data; and
provide the second mixed audio data to the at least one second conferee in, real time after severing the second connection, whereby the second announcement is not provided to the first conferee.

10. The article of manufacture according to claim 9, wherein when the instructions are executed by the one or more processors of the telephone system, the instructions further configure the telephone system to:
receive a telephone call directed to the first conferee during the conference;
determine call information relating to the telephone call; and
in response to receiving the telephone call, generate the first announcement, wherein the first announcement includes at least a portion of the call information.

11. The article of manufacture according to claim 10, wherein the portion of the information relating to the call is excluded from the second announcement.

12. The article of manufacture according to claim 11, wherein when the instructions are executed by the one or more processors of the telephone system, the instructions further configure the telephone system so that
the call information comprises the telephone number from which the telephone call originated; and
the portion of the call information comprises a translated telephone number obtained by translating the telephone number into speech.

13. The article of manufacture according to claim 11, wherein when the instructions are executed by the one or more processors of the telephone system, the instructions further configure the telephone system so that
the call information comprises name of a person associated with the telephone number from which the telephone call originated; and
the portion of the call information comprises a translated name obtained by translating the name into speech.

14. The article of manufacture according to claim 11, wherein when the instructions are executed by the one or more processors of the telephone system, the instructions further configure the telephone system to:
sever the first connection within an SCBus-based patching framework; and
sever the second connection within the SCBus-based patching framework.

15. The article of manufacture according to claim 11, wherein when the instructions are executed by the one or more processors of the telephone system, the instructions further configure the telephone system to:
sever the first connection in a time division multiplexed bus; and
sever the second connection within the time division multiplexed bus.

16. The article of manufacture according to claim 9, wherein when the instructions are executed by the one or more processors of the telephone system, the instructions further configure the telephone system to:
restore the first connection after conclusion of the first announcement being provided by the telephone system to the first conferee; and
restore the second connection after conclusion of the second announcement being provided by the telephone system to the at least one second conferee.

17. The article of manufacture according to claim 16, wherein when the instructions are executed by the one or more processors of the telephone system, the instructions further configure the telephone system to:
sever the first connection by severing a first channel in a patching framework that includes a time division multiplexed bus;
sever the second connection by severing a second channel in the patching framework;
restore the first connection by restoring the first channel in the patching framework; and restore the second connection by restoring the second channel in the patching framework.

18. The article of manufacture according to claim 17, wherein when the instructions are executed by the one or more processors of the telephone system, the instructions further configure the telephone system to:
receive the audio data generated by the at least one second conferee by receiving the audio data generated by the at least one second conferee via one or more audio buffers.

19. The article of manufacture according to claim 8, wherein when the instructions are executed by the one or more processors of the telephone system, the instructions further configure the telephone system to generate the first announcement in response to one or more predetermined conditions.

20. The article of manufacture according to claim 8, wherein when the instructions are executed by the one or more processors of the telephone system, the instructions further configure the telephone system to generate the first announcement in response to one or more predetermined conditions relating to an electronic message.

21. An article of manufacture comprising one or more machine-readable memory devices storing program code, the program code comprising instructions that, when executed by one or more processors of a telephone system, configure the telephone system to:
sever a first connection that provides to a first conferee of a telephone conference audio data generated by a second conferee of the telephone conference;
receive the audio data generated by the second conferee via a first alternative connection;
mix the audio data received via the first alternative connection with a first announcement to obtain first mixed audio data;
provide the first mixed audio data to the first conferee in real time after severing the first connection; and
provide audio data generated by the first conferee to the second conferee in real time after severing the first connection, wherein the first announcement is not provided to the second conferee.

22. An article of manufacture comprising one or more machine-readable memory devices storing program code, the program code comprising instructions that, when executed by one or more processors of a telephone system, configure the telephone system to:
receive through a patching framework of the telephone system audio data generated by a second conferee of a telephone conference, the second conferee generating the audio data from a telephone of the second conferee coupled to a telephony device of the second conferee;
mix the audio data generated by the second conferee and received through the patching framework with a first announcement to obtain first mixed audio data, wherein the first announcement comprises an informative message;
provide through the patching framework the first mixed audio data to a first conferee of the telephone conference in real time during the telephone conference, so that the audio data generated by the second conferee and the first announcement are provided to the first conferee at the same time; and
use the patching framework to prevent the at least one second conferee from hearing the first announcement in real time during the conference.

23. The article of manufacture according to claim 22, wherein when the instructions are executed by the one or more processors of the telephone system, the instructions further configure the telephone system to:
sever a first connection that provides the audio data generated by the second conferee to the first conferee;
continue to provide the first mixed audio data to the first conferee in real time after severing the first connection; and
provide audio data generated by the first conferee to the second conferee in real time after severing the first connection.

* * * * *

UNITED STATES PATENT AND TRADEMARK OFFICE
CERTIFICATE OF CORRECTION

PATENT NO. : 10,009,472 B2
APPLICATION NO. : 15/204824
DATED : June 26, 2018
INVENTOR(S) : Karl Daniel Gierach and Michael V. Shmalko Page 1 of 1

It is certified that error appears in the above-identified patent and that said Letters Patent is hereby corrected as shown below:

In the Claims

Column 13, Line 7, cancel "to, claim" and replace the cancelled text with --to claim--;

Column 13, Line 9, cancel "second, announcement" and replace the cancelled text with --second announcement--;

Column 13, Line 54, cancel "conferee, to" and replace the cancelled text with --conferee to--;

Column 13, Line 60, cancel "in, real" and replace the cancelled text with --in real--.

Signed and Sealed this
First Day of January, 2019

Andrei Iancu
*Director of the United States Patent and Trademark Office*